(12) United States Patent
Yamaguchi et al.

(10) Patent No.: US 12,139,058 B2
(45) Date of Patent: Nov. 12, 2024

(54) VEHICLE SEAT

(71) Applicant: TS TECH CO., LTD., Asaka (JP)

(72) Inventors: Takanori Yamaguchi, Tochigi (JP); Heehyeok Park, Tochigi (JP); Satoshi Suzuki, Tochigi (JP); Hiroya Imai, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 0 days.

(21) Appl. No.: 17/785,969

(22) PCT Filed: Dec. 17, 2020

(86) PCT No.: PCT/JP2020/047091
§ 371 (c)(1),
(2) Date: Jun. 16, 2022

(87) PCT Pub. No.: WO2021/125254
PCT Pub. Date: Jun. 24, 2021

(65) Prior Publication Data
US 2024/0166106 A1     May 23, 2024

(30) Foreign Application Priority Data

Dec. 20, 2019   (JP) .................................. 2019-230108

(51) Int. Cl.
*B60N 2/62*    (2006.01)
*B60N 2/02*    (2006.01)
*B60N 2/90*    (2018.01)

(52) U.S. Cl.
CPC ................. *B60N 2/62* (2013.01); *B60N 2/02* (2013.01); *B60N 2/914* (2018.02)

(58) Field of Classification Search
CPC .................................. B60N 2/62; B60N 2/914
See application file for complete search history.

(56) References Cited

U.S. PATENT DOCUMENTS 5,082,326 A      1/1992   Sekido et al.
8,128,167 B2 *   3/2012   Zhong .................... B60N 2/62
                                                 297/284.11
(Continued)

FOREIGN PATENT DOCUMENTS

CN          110027448 A       7/2019
GB            2232078 A      12/1990
(Continued)

OTHER PUBLICATIONS

PCT International Search Report (w/ English translation) for corresponding PCT Application No. PCT/JP2020/047091, mailed on Feb. 22, 2021, 7 pages.

(Continued)

*Primary Examiner* — David R Dunn
*Assistant Examiner* — Tania Abraham
(74) *Attorney, Agent, or Firm* — Dority & Manning, P.A.

(57) ABSTRACT

In a vehicle seat, to reduce the driving force for making the seat expand and contract, a vehicle seat includes a first frame, a second frame supported to be movable relative to the first frame toward a first side and a second side opposite to the first side, and an actuator for causing the second frame relative to the first frame toward the first side and the second side. The actuator includes a first actuator that urges the second frame toward the first side, a second actuator that urges the second frame toward the second side, and a control device that controls an urging force generated by each of the first actuator and the second actuator. Preferably, each of the first actuator and the second actuator includes a fluid bag to and from which compressed air is supplied and discharged by the control device.

10 Claims, 11 Drawing Sheets

(56) References Cited

U.S. PATENT DOCUMENTS

| | | | |
|---|---|---|---|
| 9,809,132 B2* | 11/2017 | Bortolon | B60N 2/62 |
| 10,800,292 B2 | 10/2020 | Tsukamoto et al. | |
| 2008/0191531 A1* | 8/2008 | Hoffmann | B60N 2/914 |
| | | | 297/284.1 |
| 2014/0265506 A1* | 9/2014 | McMillen | B60N 2/829 |
| | | | 297/391 |
| 2017/0151895 A1* | 6/2017 | Von Ballmoos | B60N 2/914 |
| 2017/0151898 A1* | 6/2017 | An | B60N 2/914 |
| 2021/0094454 A1* | 4/2021 | Humer | A47C 7/503 |

FOREIGN PATENT DOCUMENTS

| | | |
|---|---|---|
| JP | H02-142329 | 12/1990 |
| JP | 11-151958 | 6/1999 |
| JP | 2010-279650 | 12/2010 |
| JP | 2014-111406 | 6/2014 |
| JP | 2015-047384 | 3/2015 |
| JP | 2019-123498 | 7/2019 |

OTHER PUBLICATIONS

Chinese Office Action (w/ English machine-translation) for corresponding Application No. 202080087172.0, dated Mar. 25, 2024, 14 pages.

* cited by examiner

VEHICLE SEAT

CROSS REFERENCE TO RELATED APPLICATIONS

This application is the U.S. National Stage entry of International Application No. PCT/JP2020/047091 filed under the Patent Cooperation Treaty on Dec. 17, 2020, which claims priority to Japanese Patent Application No. 2019-230108 filed on Dec. 20, 2019, both of which are incorporated herein by reference.

TECHNICAL FIELD

The present invention relates to a vehicle seat.

BACKGROUND ART

Patent Document 1 discloses a vehicle seat including a seat cushion frame, a front plate provided to form a bag chamber between itself and the front end of the seat cushion frame, a fluid bag that is provided in the bag chamber and expands/contracts according to an amount of fluid injected therein, and a spring that is provided between the seat cushion frame and the front plate to always urge the bag chamber to shorten the fore and aft length of the bag chamber. When air is supplied to the fluid bag, the fluid bag expands and the fore and aft length of the seat cushion increases, and when the supply of air to the fluid bag is stopped, the fluid bag is compressed by the spring and the fore and aft length of the seat cushion is reduced.

PRIOR ART DOCUMENT(S)

Patent Document(s)

[Patent Document 1] JP2015-47384A

SUMMARY OF THE INVENTION

Task to be Accomplished by the Invention

In the vehicle seat of Patent Document 1, it is necessary to supply air to the fluid bag to extend the seat cushion against the urging force of the spring, and there is a problem that a large driving force is necessary to make the seat expand and contract.

In view of the foregoing background, an object of the present invention is to provide a vehicle seat in which the driving force for making the seat expand and contract is reduced.

Means to Accomplish the Task

To achieve the above object, the present invention provides a vehicle seat (1) comprising: a first frame (15); a second frame (16) supported to be movable relative to the first frame toward a first side and a second side opposite to the first side; and an actuator (30) for causing the second frame to move relative to the first frame toward the first side and the second side, wherein the actuator comprises a first actuator (31) that urges the second frame toward the first side, a second actuator (32) that urges the second frame toward the second side, and a control device (33) that controls an urging force generated by each of the first actuator and the second actuator.

According to this aspect, when one of the actuators generates an urging force, the other actuator can be made not to generate a resistive force. Thereby, the driving force for making the seat expand and contract can be reduced.

In the above aspect, preferably, each of the first actuator and the second actuator includes a fluid bag (35, 36) to and from which compressed air is supplied and discharged by the control device.

According to this aspect, the first and second actuators can be formed simply and at low cost.

In the above aspect, preferably, the first frame includes a first wall (51) and a second wall (52) disposed on the first side relative to the first wall, the second frame includes a pressure receiving plate (53) disposed between the first wall and the second wall, the first actuator includes a first fluid bag (35) disposed between the first wall and the pressure receiving plate, the second actuator includes a second fluid bag (36) disposed between the second wall and the pressure receiving plate, and compressed air is supplied and discharged to and from the first fluid bag and the second fluid bag by the control device.

According to this aspect, the actuators can be formed simply.

In the above aspect, preferably, the first actuator includes a guide member (80) that slidably contacts the first fluid bag and restricts expansion and contraction directions of the first fluid bag to the first side and the second side.

According to this aspect, the expansion of the first fluid bag can be efficiently converted to the movement of the second frame.

In the above aspect, preferably, the first actuator includes a rail (84) extending from the first side toward the second side and a slider (85) supported by the rail to be slidingly movable and joined to the first fluid bag.

According to this aspect, the expansion of the first fluid bag can be efficiently converted to the movement of the second frame.

In the above aspect, preferably, an end portion of the first fluid bag on the first side and an end portion of the second fluid bag on the second side are joined to each other by a connecting member (87) penetrating the pressure receiving plate.

According to this aspect, the positions of the first fluid bag and the second fluid bag relative to the pressure receiving plate become stable. Thereby, the expansion of the first fluid bag and the second fluid bag can be efficiently converted to the movement of the second frame.

In the above aspect, preferably, a lower portion of the first wall and a lower portion of the second wall are coupled by a bottom wall, and the first wall, the bottom wall, and the second wall cooperate to form a groove structure that opens upward.

According to this aspect, the first fluid bag and the second fluid bag can be accommodated inside the groove structure.

In the above aspect, preferably, the first frame is a frame constituting the seat cushion and includes left and right side members (17) and a front member (18) coupling front ends of the left and right side members to each other, and the second frame includes an upper plate (22) provided on an upper surface of the front member and supported to be movable relative to the front member to a front side and a rear side and a front plate (23) depending from a front end of the upper plate to be disposed in front of the front member.

According to this aspect, it is possible to cause the front portion of the seat cushion to expand and contract in the fore and aft direction.

In the above aspect, preferably, the front member has an opening (71) vertically penetrating therethrough and extending in a fore and aft direction, and the pressure receiving plate extends from the upper plate to pass the opening and protrudes to below the front member.

According to this aspect, the pressure receiving plate can be disposed at a position where it does not interfere with the occupant's legs.

In the above aspect, preferably, the first wall and the second wall are disposed below the front member.

According to this aspect, the first wall and the second wall can be disposed at positions where they do not interfere with the occupant's legs.

Effect of the Invention

A vehicle seat (1) comprises: a first frame (15); a second frame (16) supported to be movable relative to the first frame toward a first side and a second side opposite to the first side; and an actuator (30) for causing the second frame to move relative to the first frame toward the first side and the second side, wherein the actuator comprises a first actuator (31) that urges the second frame toward the first side, a second actuator (32) that urges the second frame toward the second side, and a control device (33) that controls an urging force generated by each of the first actuator and the second actuator. According to this aspect, when one of the actuators generates an urging force, the other actuator can be made not to generate a resistive force. Thereby, the driving force for making the seat expand and contract can be reduced.

In the above aspect, preferably, each of the first actuator and the second actuator includes a fluid bag (35, 36) to and from which compressed air is supplied and discharged by the control device. According to this aspect, the first and second actuators can be formed simply and at low cost.

In the above aspect, preferably, the first frame includes a first wall (51) and a second wall (52) disposed on the first side relative to the first wall, the second frame includes a pressure receiving plate (53) disposed between the first wall and the second wall, the first actuator includes a first fluid bag (35) disposed between the first wall and the pressure receiving plate, the second actuator includes a second fluid bag (36) disposed between the second wall and the pressure receiving plate, and compressed air is supplied and discharged to and from the first fluid bag and the second fluid bag by the control device. According to this aspect, the actuators can be formed simply.

In the above aspect, preferably, the first actuator includes a guide member (80) that slidably contacts the first fluid bag and restricts expansion and contraction directions of the first fluid bag to the first side and the second side. According to this aspect, the expansion of the first fluid bag can be efficiently converted to the movement of the second frame.

In the above aspect, preferably, the first actuator includes a rail (84) extending from the first side toward the second side and a slider (85) supported by the rail to be slidingly movable and joined to the first fluid bag. According to this aspect, the expansion of the first fluid bag can be efficiently converted to the movement of the second frame.

In the above aspect, preferably, an end portion of the first fluid bag on the first side and an end portion of the second fluid bag on the second side are joined to each other by a connecting member (87) penetrating the pressure receiving plate. According to this aspect, the positions of the first fluid bag and the second fluid bag relative to the pressure receiving plate become stable. Thereby, the expansion of the first fluid bag and the second fluid bag can be efficiently converted to the movement of the second frame.

In the above aspect, preferably, a lower portion of the first wall and a lower portion of the second wall are coupled by a bottom wall, and the first wall, the bottom wall, and the second wall cooperate to form a groove structure that opens upward. According to this aspect, the first fluid bag and the second fluid bag can be accommodated inside the groove structure.

In the above aspect, preferably, the first frame is a frame constituting the seat cushion and includes left and right side members (17) and a front member (18) coupling front ends of the left and right side members to each other, and the second frame includes an upper plate (22) provided on an upper surface of the front member and supported to be movable relative to the front member to a front side and a rear side and a front plate (23) depending from a front end of the upper plate to be disposed in front of the front member. According to this aspect, it is possible to cause the front portion of the seat cushion to expand and contract in the fore and aft direction.

In the above aspect, preferably, the front member has an opening (71) vertically penetrating therethrough and extending in a fore and aft direction, and the pressure receiving plate extends from the upper plate to pass the opening and protrudes to below the front member. According to this aspect, the pressure receiving plate can be disposed at a position where it does not interfere with the occupant's legs.

In the above aspect, preferably, the first wall and the second wall are disposed below the front member. According to this aspect, the first wall and the second wall can be disposed at positions where they do not interfere with the occupant's legs.

MODE(S) FOR CARRYING OUT THE INVENTION

In the following, an embodiment in which s vehicle seat according to the present invention is applied to a seat of an automobile will be described with reference to the drawings.

Figure 1:
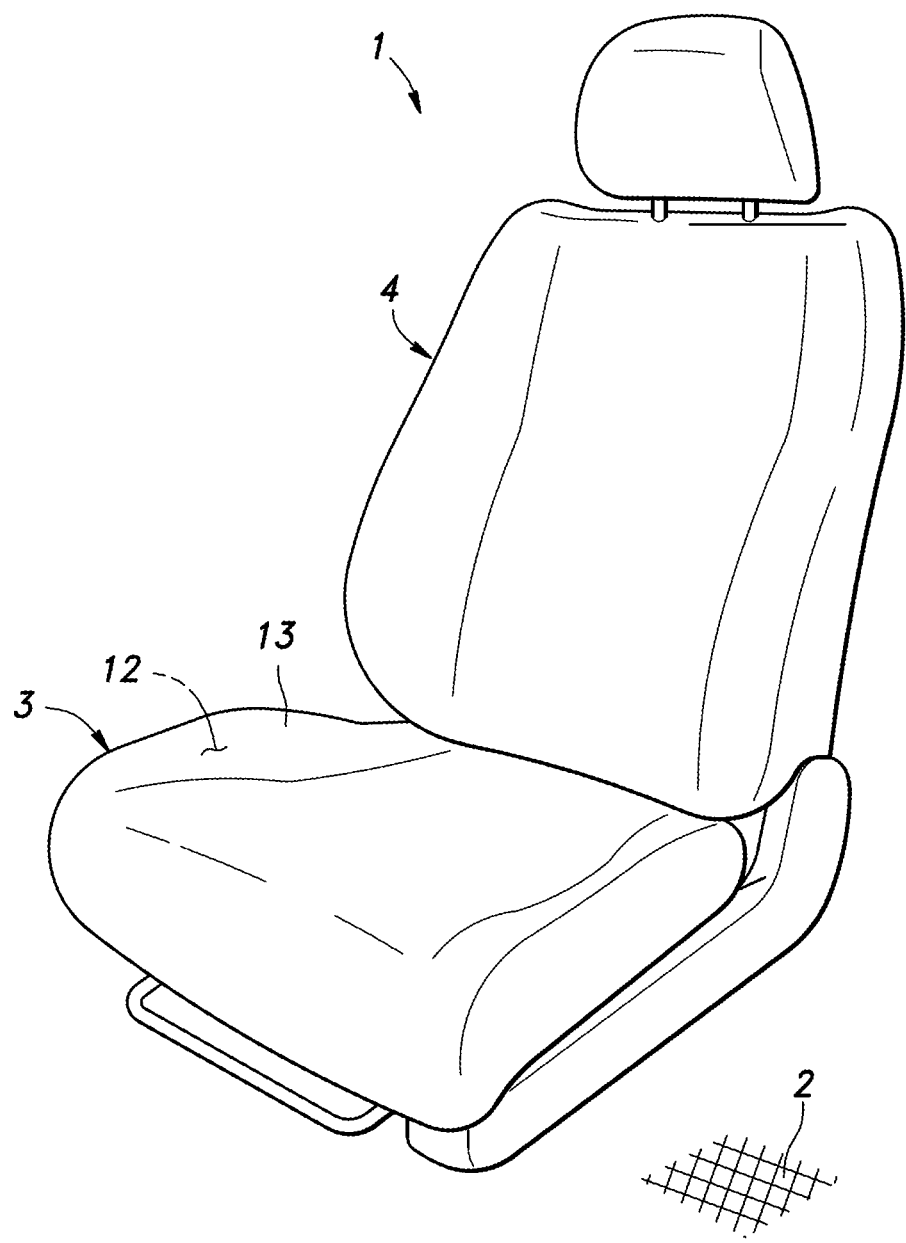
FIG. 1 is a perspective view of a seat according to an embodiment.
Figure 2:
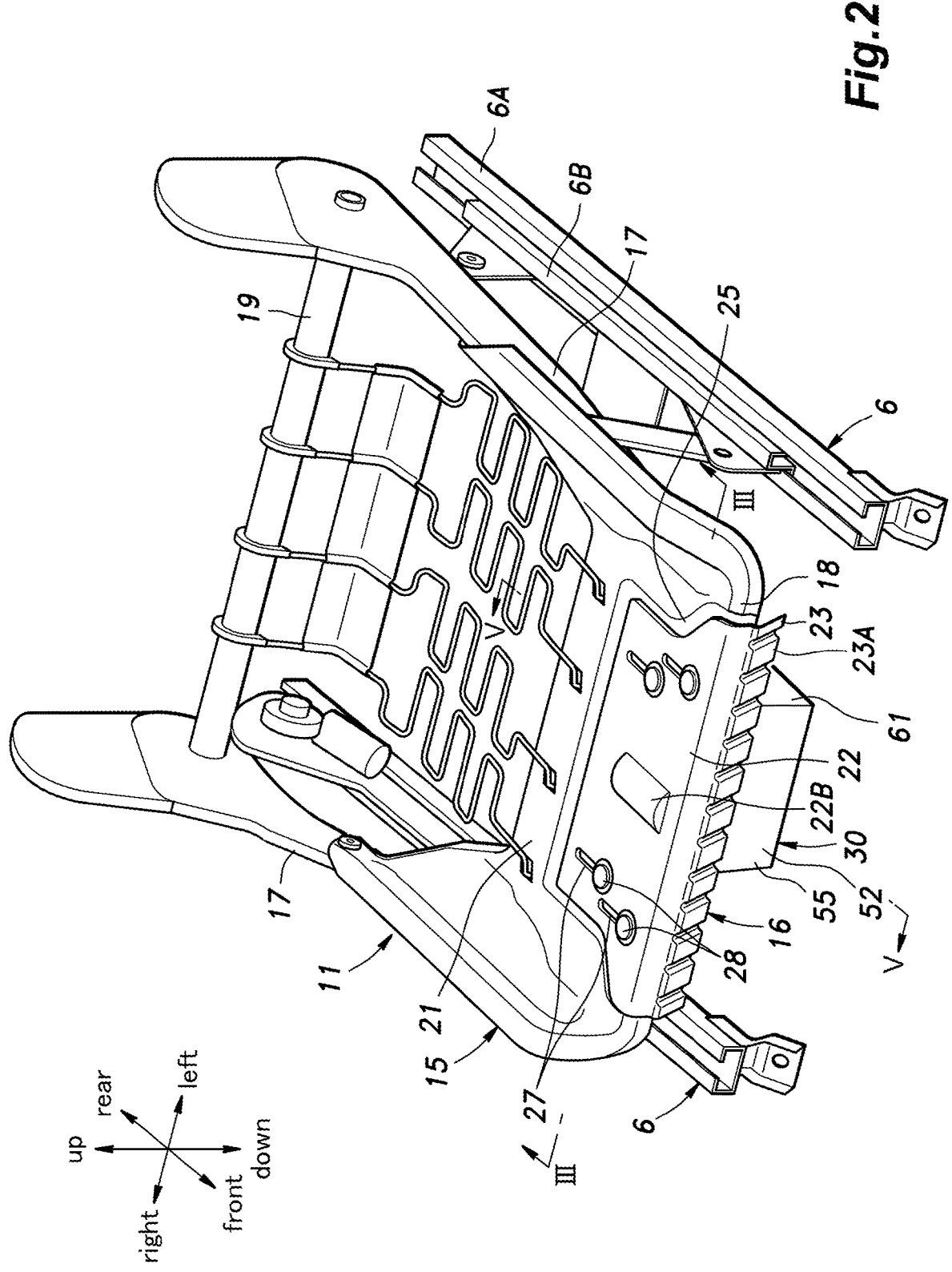
FIG. 2 is a perspective view of a seat cushion frame.

As shown in FIG. 1, a seat 1 includes a seat cushion 3 provided on a floor 2 of an automobile and a seat back 4 supported on a rear portion of the seat cushion 3. As shown in FIG. 2, the seat cushion 3 may be provided on the floor 2 via slide rails 6. The slide rails 6 include left and right lower rails 6A joined to the floor 2 and left and right upper rails 6B supported by the left and right lower rails 6A, respectively, in a slidingly movable manner. The seat cushion 3 is joined to the left and right upper rails 6B. A lift device may be interposed between the seat cushion 3 and the upper rails 6B.

The seat cushion 3 includes a seat cushion frame 11 forming a skeleton, a pad 12 supported by the seat cushion frame 11, and a skin member 13 covering the surface of the pad 12. The seat cushion frame 11 includes a first frame 15 and a second frame 16 supported to be movable relative to the first frame 15 toward a first side and a second side opposite to the first side. Since the second frame 16 is movable relative to the first frame 15, it may be referred to as a movable frame. In the present embodiment, the second frame 16 is movable relative to the first frame 15 toward a front side as the first side and a rear side as the second side.

In the present embodiment, the first frame 15 includes left and right side members 17 extending in the fore and aft direction and a front member 18 extending laterally to couple the front ends of the left and right side members 17 to each other. Further, the first frame 15 may include a rear member 19 extending laterally to couple the rear ends of the left and right side members 17 to each other. The left and right side members 17 and the front member 18 are formed by bending molding of a metal plate. The front member 18 includes a plate-shaped portion 21 having surfaces facing upward and downward at a laterally central portion thereof. The plate-shaped portion 21 has a predetermined width in the fore and aft direction.

The second frame 16 includes an upper plate 22 provided on the upper surface of the plate-shaped portion 21 of the front member 18 and supported to be movable relative to the front member 18 to the front side and the rear side and a front plate 23 extending downward from the front end of the upper plate 22 to be disposed in front of the front member 18.

Figure 3:
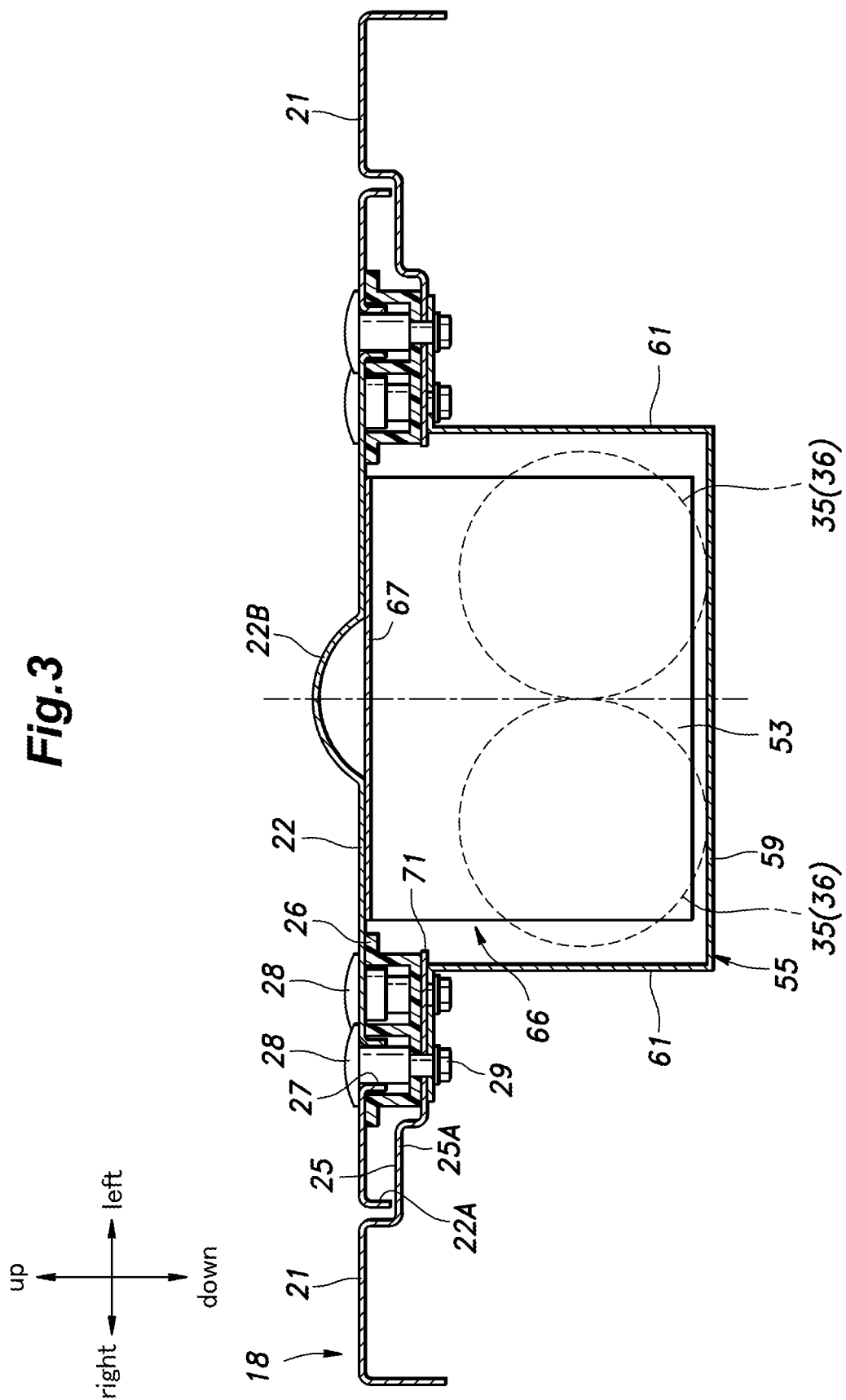
FIG. 3 is a sectional view of a front portion of the seat cushion frame (III-III sectional view of FIG. 2)

As shown in FIGS. 2 and 3, the plate-shaped portion 21 of the front member 18 is formed with an accommodation recess 25 that is recessed downward. The accommodation recess 25 is provided in a front portion of the plate-shaped portion 21. The front end of the accommodation recess 25 reaches the front end of the front member 18. On the other hand, the rear end of the accommodation recess 25 is positioned on the upper surface of the plate-shaped portion 21. The upper surface of the bottom portion 25A of the accommodation recess 25 is provided with a pair of left and right support members 26 extending in the fore and aft direction. Each support member 26 is made of a resin material. Each support member 26 is preferably made of a resin material having a low friction coefficient. The upper plate 22 of the second frame 16 is placed on the upper surfaces of the left and right support members 26 to be slidable in the fore and aft direction.

The upper plate 22 is formed with multiple elongated holes 27 penetrating therethrough in the thickness direction and extending in the fore and aft direction. In the present embodiment, the elongated holes 27 include two pairs, a left pair and a right pair, provided at positions overlapping the support members 26 in plan view. With multiple nuts 29 and bolts 28 passing the elongated holes 27, the support members 26, and the bottom portion 25A of the accommodation recess 25, the upper plate 22 is mounted to the support members 26 and the front member 18 to be slidingly movable in the fore and aft direction. In the state in which the upper plate 22 is placed on the support members 26, the upper surface of the upper plate 22 is disposed at the same height as the upper surface of the front member 18 excluding the accommodation recess 25.

As shown in FIG. 3, the left and right side edges and the rear edge of the upper plate 22 are provided with edge walls 22A that extend downward. The edge walls 22A are preferably formed by bending the side edges of the upper plate 22. Also, the central portion of the upper plate 22 is provided with a reinforcement rib 22B protruding upward and extending in the fore and aft direction.

Figure 4:
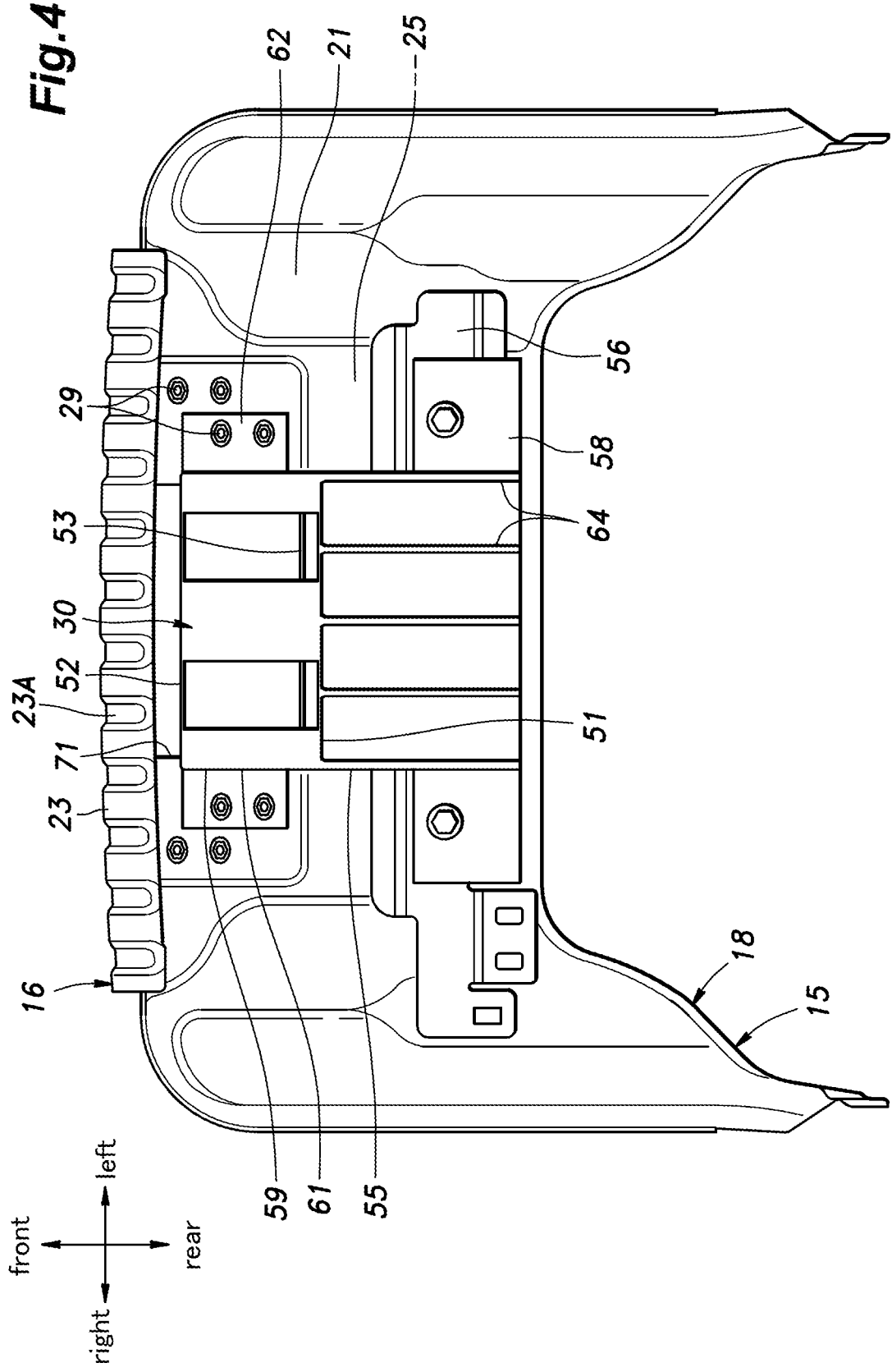
FIG. 4 is a bottom view of the front portion of the seat cushion frame.
Figure 5:
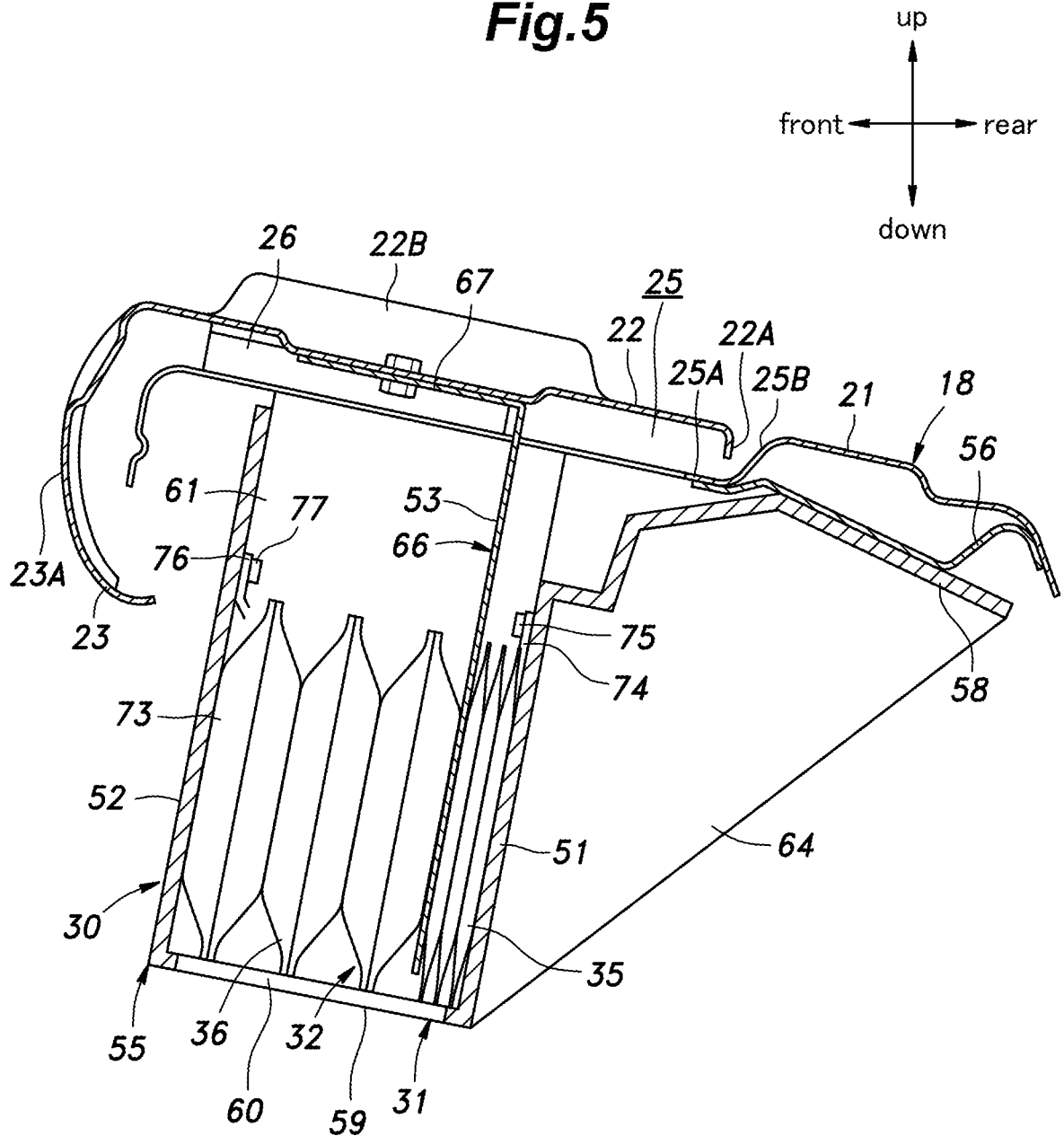
FIG. 5 is a sectional view of the front portion of the seat cushion frame (IV-IV sectional view of FIG. 2)

As shown in FIGS. 2, 4, and 5, the front plate 23 is formed to have a curved surface that is convex forward as viewed from lateral side. The front plate 23 is formed with multiple reinforcement ribs 23A that extend vertically. The multiple reinforcement ribs 23A are preferably arranged in the lateral direction. The second frame 16 is preferably formed by bending molding of a metal plate.

With the upper plate 22 being displaced in the fore and aft direction relative to the bolt 28 disposed in each elongated hole 27, the second frame 16 moves between an initial position and a protruding position relative to the front member 18 of the first frame 15. The second frame 16 reaches the protruding position by moving from the initial position toward the front side as the first side. Also, the second frame 16 returns to the initial position by moving from the protruding position toward the rear side as the second side.

The pad 12 is disposed to cover the upper surface and the front surface of the second frame 16. When the second frame 16 moves from the initial position to the protruding position, the second frame 16 slides relative to the pad 12. The pad 12 has a length sufficient to be capable of covering the front plate 23 of the second frame 16 even when the second frame 16 is in the protruding position. The front edge of the pad 12 preferably extends to be lower than the lower edge of the front plate 23 of the second frame 16 when the second frame 16 is in the initial position.

The vehicle seat 1 further includes an actuator 30 for causing the second frame 16 to move relative to the first frame 15 toward the front side and the rear side. The actuator 30 includes a first actuator 31 that urges the second frame 16 toward the front side, a second actuator 32 that urges the second frame 16 toward the rear side, and a control device 33 that controls the urging force generated by each of the first actuator 31 and the second actuator 32.

Figure 6:
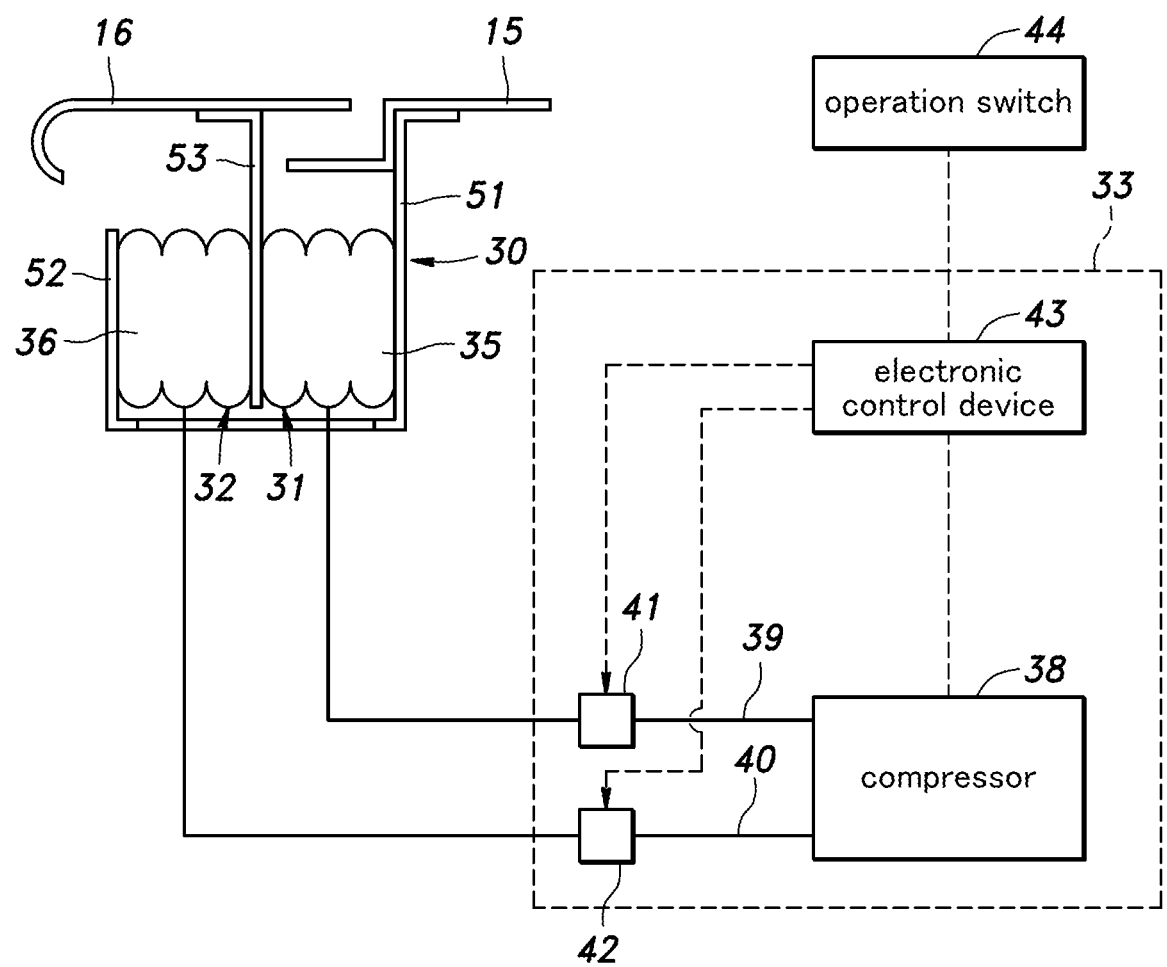
FIG. 6 is a configuration diagram of an actuator and a control device.

As shown in FIGS. 5 and 6, the first actuator 31 and the second actuator 32 respectively include fluid bags 35, 36 which expand when compressed air is supplied and contract when the compressed air is discharged. The first actuator 31 includes at least one first fluid bag 35, and the second actuator 32 includes at least one second fluid bag 36. The control device 33 includes a compressor 38 that generates the compressed air, a first connection pipe 39 connecting the compressor 38 with the first fluid bag 35 of the first actuator 31, a second connection pipe 40 connecting the compressor 38 with the second fluid bag 36 of the second actuator 32, a first control valve 41 provided in the first connection pipe 39, a second control valve 42 provided in the second connection pipe 40, an electronic control device 43 (ECU) that controls the compressor 38, the first control valve 41, and the second control valve 42, and an operation switch 44 for inputting signals to the electronic control device 43. The operation switch 44 includes an extension button and a contraction button and outputs a signal according to the operation state of the extension button and the contraction button to the electronic control device 43.

The first control valve 41 and the second control valve 42 can each take a supply state for connecting the compressor 38 with the fluid bags 35, 36, a holding state for blocking the flow of air to and from the fluid bags 35, 36, and a discharge state for connecting the fluid bags 35, 36 with the outside, respectively. When the control valve 41, 42 is in the supply state, the compressed air is supplied to the corresponding fluid bag 35, 36, and the fluid bag 35, 36 expands. When the control valve 41, 42 is in the holding state, the flow of air to and from the corresponding fluid bag 35, 36 is blocked, and the size of the fluid bag 35, 36 is maintained. When the control valve 41, 42 is in the discharge state, the compressed air in the corresponding fluid bag 35, 36 is discharged to the outside, and the fluid bag 35, 36 contracts.

The first frame 15 includes a first wall 51 and a second wall 52 disposed on the front side relative to the first wall 51. The second frame 16 includes a pressure receiving plate 53 disposed between the first wall 51 and the second wall 52. The first fluid bag 35 is disposed between the first wall 51 and the pressure receiving plate 53, while the second fluid bag 36 is disposed between the second wall 52 and the pressure receiving plate 53. As the first fluid bag 35 and the second fluid bag 36 expand and contract, the pressure receiving plate 53 moves relative to the first wall 51 and the second wall 52 and the second frame 16 moves relative to the first frame 15 in the fore and aft direction.

In the present embodiment, the first wall 51 and the second wall 52 are configured by a case 55 mounted to the plate-shaped portion 21 of the front member 18. As shown in FIGS. 4 and 5, a laterally extending reinforcement member 56 is attached to the lower surface of the plate-shaped portion 21. The reinforcement member 56 is formed in a groove shape that opens upward. The reinforcement member 56 forms a closed cross section structure in cooperation with the plate-shaped portion 21. The reinforcement member 56 is disposed on the plate-shaped portion 21 at a position more rearward than the accommodation recess 25. The reinforcement member 56 may extend along a rear wall portion 25B forming the rear edge of the accommodation recess 25 so that the rear wall portion 25B constitutes a part of the closed cross section structure.

The case 55 includes a rear flange 58 extending laterally and fastened to the reinforcement member 56, the first wall 51 extending downward from the front edge of the rear flange 58 and having surfaces facing forward and rearward, a bottom wall 59 extending forward from the lower edge of the first wall 51 and having surfaces facing upward and downward, and the second wall 52 extending upward from the front edge of the bottom wall 59 and having surfaces facing forward and rearward. The first wall 51 and the second wall 52 oppose each other via a distance in the fore and aft direction. The bottom wall 59 couples the lower portion of the first wall 51 and the lower portion of the second wall 52 to each other. The first wall 51, the bottom wall 59, and the second wall 52 cooperate to form a groove structure that opens upward and extends laterally. Each of the first wall 51, the bottom wall 59, and the second wall 52 is preferably disposed below the front member 18, specifically, below the bottom portion 25A of the accommodation recess 25 of the plate-shaped portion 21.

The right end portions of the first wall 51, the bottom wall 59, and the second wall 52 are preferably coupled to each other by an end wall 61 having surfaces facing left and right. Similarly, the left end portions of the first wall 51, the bottom wall 59, and the second wall 52 are preferably coupled to each other by an end wall 61 having surfaces facing left and right. The first wall 51, the bottom wall 59, the second wall 52, and the left and right end walls 61 cooperate each other to form a box structure that opens upward. The upper ends of the end walls 61 are preferably provided with left and right side flanges 62, respectively, which are fastened to the lower surface of the plate-shaped portion 21 of the front member 18. Each side flange 62 is preferably fastened to the lower surface of the bottom portion 25A of the accommodation recess 25 of the plate-shaped portion 21. Some of the multiple bolts 28 and nuts 29 may fasten together the side flanges 62, the upper plate 22, the support members 26, and the bottom portion 25A of the accommodation recess 25.

The case 55 preferably includes multiple reinforcement ribs 64 coupling the first wall 51 with the rear flange 58 at a boundary portion between the first wall 51 and the rear flange 58. Each reinforcement rib 64 is formed in a triangular plate shape having surfaces facing left and right. The reinforcement ribs 64 suppress tilt of the first wall 51 relative to the rear flange 58.

As shown in FIG. 5, the pressure receiving plate 53 extends downward from the lower surface of the upper plate 22 of the second frame 16. The pressure receiving plate 53 is preferably formed of a plate-shaped member 66 fastened to the upper plate 22. The plate-shaped member 66 has a flange 67 fastened to the lower surface of the upper plate 22. The pressure receiving plate 53 extends downward from an edge portion of the flange 67 and has surfaces facing forward and rearward. The plate-shaped member 66 is preferably formed in an L-shape by the flange 67 and the pressure receiving plate 53.

The plate-shaped portion 21 of the front member 18 has an opening 71 vertically penetrating therethrough and extending in the fore and aft direction. The opening 71 is formed in the bottom portion 25A of the accommodation recess 25. The opening 71 extends in the fore and aft direction and reaches the front edge of the front member 18. The pressure receiving plate 53 passes the opening 71 to protrude to below the plate-shaped portion 21, and is disposed between the first wall 51 and the second wall 52. The lower end of the pressure receiving plate 53 opposes the bottom wall 59 via a gap. The fore and aft length of the opening 71 is set to enable the fore and aft movement of the pressure receiving plate 53 in response to the fore and aft movement of the second frame 16.

The first fluid bag 35 and the second fluid bag 36 are formed by joining edges of multiple sheet materials to each other. The sheet materials are preferably made of resin such as vinyl and urethane, for example. The joining of the sheet materials is preferably achieved by heat welding, for example. Each of the first fluid bag 35 and the second fluid bag 36 preferably includes multiple cells 73. The multiple cells 73 may be independent from each other, and each of them may be connected to the first connection pipe 39 or the second connection pipe 40. Alternatively, the multiple cells 73 may be coupled to each other to permit flow of air therebetween, and one of the multiple cells 73 may be connected to the first connection pipe 39 or the second connection pipe 40.

Each of the multiple cells 73 configuring the first fluid bag 35 and the second fluid bag 36 is preferably formed in a disc shape to be capable of expanding and contracting in the axial direction. Also, the multiple cells 73 formed in a disc shape are preferably arranged in the axial direction and joined to each other. Thereby, the first fluid bag 35 and the second fluid bag 36 can expand and contract in the fore and aft direction.

Figure 7:
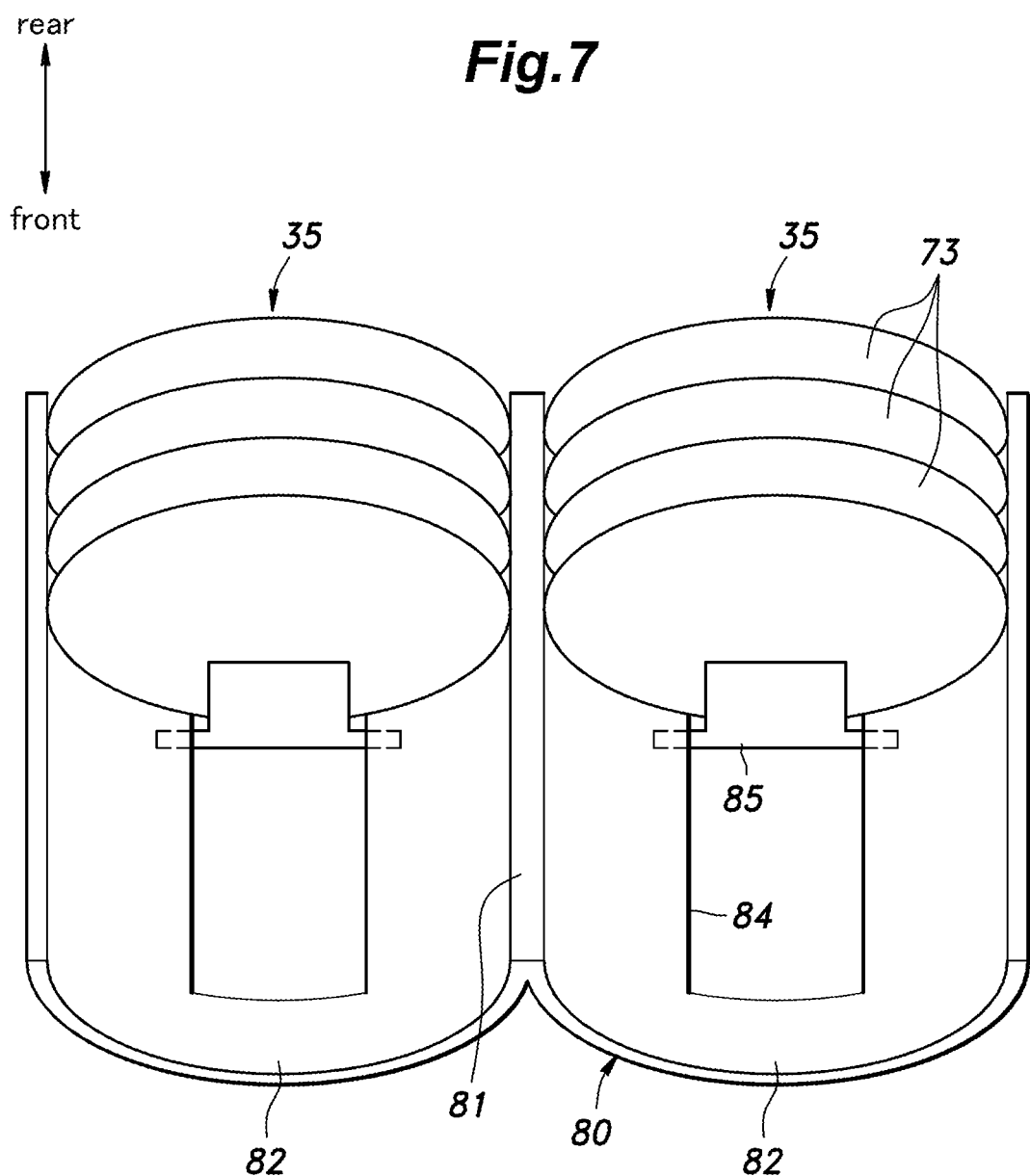
FIG. 7 is a perspective view of a guide member.

As shown in FIGS. 3 and 7, in the present embodiment, the first actuator 31 includes two first fluid bags 35 arranged laterally, and each of the first fluid bags 35 includes multiple cells 73 arranged in the fore and aft direction. As shown in FIG. 5, the rear end of each first fluid bag 35 is provided with at least one connection piece 74, and the connection piece 74 is joined to the first wall 51 by a fastening member 75 such as a clip or a rivet. The front end of each first fluid bag 35 is in contact with the rear surface of the pressure receiving plate 53. The front end of each first fluid bag 35 may be provided with a connection piece so that the connection piece is joined to the pressure receiving plate 53 by a fastening member such as a clip or a rivet.

As shown in FIG. 3, the second actuator 32 includes two second fluid bags 36 arranged laterally, and each of the second fluid bags 36 includes multiple cells 73 arranged in the fore and aft direction. As shown in FIG. 5, the front end of each second fluid bag 36 is provided with at least one connection piece 76, and the connection piece 76 is joined to the second wall 52 by a fastening member 77 such as a clip or a rivet. The rear end of each second fluid bag 36 is in contact with the front surface of the pressure receiving plate 53. The rear end of each second fluid bag 36 may be provided with a connection piece so that the connection piece is joined to the pressure receiving plate 53 by a fastening member such as a clip or a rivet.

The first fluid bags 35 and the second fluid bags 36 are accommodated in the groove structure (box structure) of the case 55. Thereby, the expansion and contraction directions of the first fluid bags 35 and the second fluid bags 36 are restricted, and the expansion and contraction of the first fluid bags 35 and the second fluid bags 36 are efficiently converted to the movement of the pressure receiving plate 53.

As shown in FIG. 7, the first actuator 31 preferably includes a guide member 80 that slidably contacts the first fluid bags 35 and restricts the expansion and contraction directions of the first fluid bags 35 to the front side and the rear side. The guide member 80 is preferably provided on the upper surface of the bottom wall 59. The guide member 80 includes a guide wall 81 protruding upward from the bottom wall 59 and extending in the fore and aft direction. The guide wall 81 is preferably disposed between the left and right first fluid bags 35. Also, the guide member 80 preferably has left and right guide grooves 82 recessed downward and extending in the fore and aft direction. In each guide groove 82, the lower portion of the corresponding first fluid bag 35 is disposed. The shape of the transverse cross section of the guide groove 82 preferably matches the shape of the lower portion of the first fluid bag 35. In the present embodiment, since the first fluid bag 35 has a circular transverse cross section, the guide groove 82 is preferably formed to have a semi-circular transverse cross section. The guide member 80 is disposed between the lower end of the pressure receiving plate 53 and the bottom wall 59 so as not to interfere with the pressure receiving plate 53. Also, the pressure receiving plate 53 may be formed with a cutout for avoiding interference with the guide member 80. Due to the guide member 80, the expansion and contraction directions of the first fluid bags 35 become stable, and the first fluid bags 35 can efficiently push the pressure receiving plate 53.

Similarly to the first actuator 31, the second actuator 32 preferably includes a guide member that restricts the expansion and contraction directions of the second fluid bags 36 to the front side and the rear side. The configuration of the guide member of the second actuator 32 may be similar to the configuration of the guide member 80 of the first actuator 31.

The first actuator 31 may include a pair of rails 84 extending from the front side toward the rear side and a pair of sliders 85 supported by the respective rails 84 to be slidingly movable and joined to the respective first fluid bags 35. Each slider 85 is preferably joined to the front end of the corresponding first fluid bag 35. Each rail 84 is preferably provided on the bottom wall 59. Due to the rails 84 and the sliders 85, the front ends of the first fluid bags 35 move along the respective rails 84. Thereby, the expansion and contraction directions of the first fluid bags 35 become stable, and the first fluid bags 35 can efficiently push the pressure receiving plate 53.

The first actuator 31 preferably includes at least one of the rails 84 and the sliders 85, the guide wall 81, and the guide grooves 82.

Similarly to the first actuator 31, the second actuator 32 may include a pair of rails extending from the front side toward the rear side and a pair of sliders supported by the respective rails to be slidingly movable and joined to the respective second fluid bags 36. Each slider is preferably joined to the rear end of the corresponding second fluid bag 36. The configuration of the rails and the sliders of the second actuator 32 may be similar to the configuration of the rails and the sliders of the first actuator 31.

Figure 8:
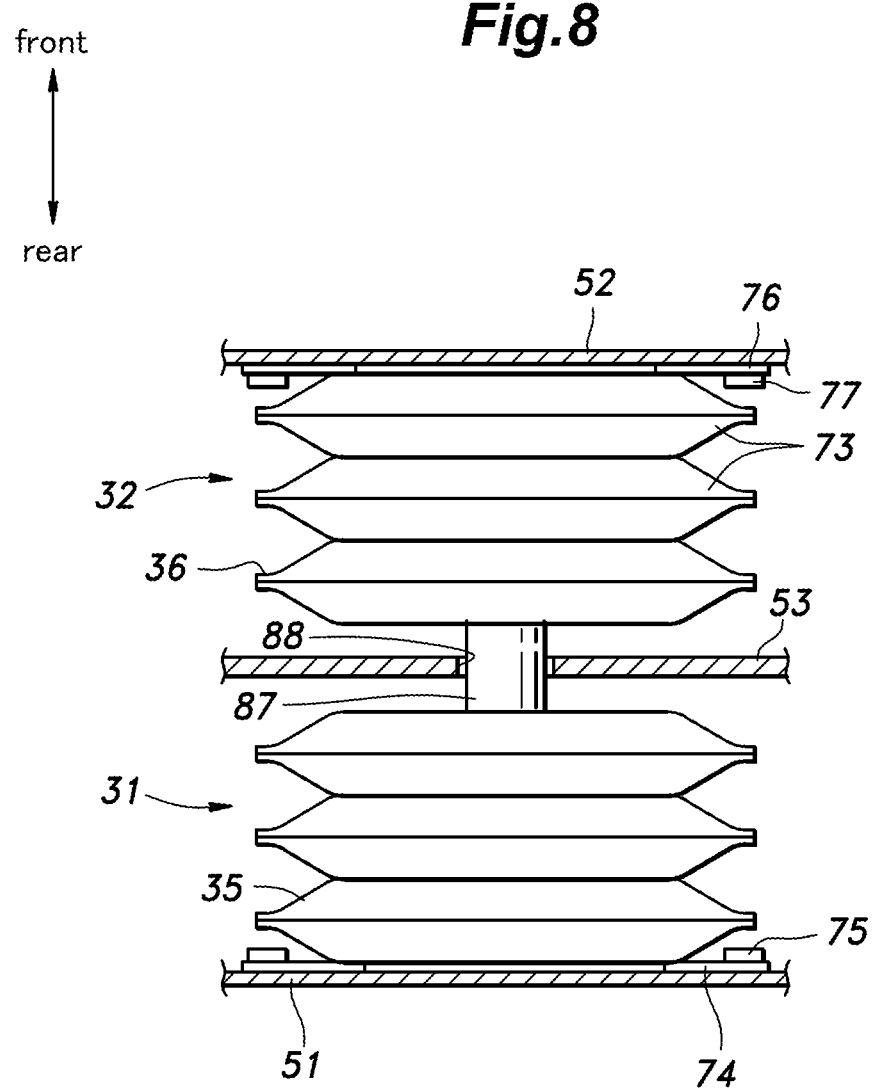
FIG. 8 is an explanatory diagram showing a modification of the actuator.

As shown in FIG. 8, the front end, which is the end portion on the first side, of the first fluid bag 35 and the rear end, which is the end portion on the second side, of the second fluid bag 36 may be joined to each other by a connecting member 87 penetrating the pressure receiving plate 53. The connecting member 87 preferably consists of a shaft member extending in the fore and aft direction to penetrate the pressure receiving plate 53, for example. The pressure receiving plate 53 is formed with a through hole 88 through which the connecting member 87 passes. The through hole 88 may be a slit extending to the side edge of the pressure receiving plate 53. According to this aspect, the positions of the front end of the first fluid bag 35 and the rear end of the second fluid bag 36 relative to the pressure receiving plate 53 are restricted, and the positions of the first fluid bag 35 and the second fluid bag 36 at the time of expansion and contraction become stable.

Figure 9:
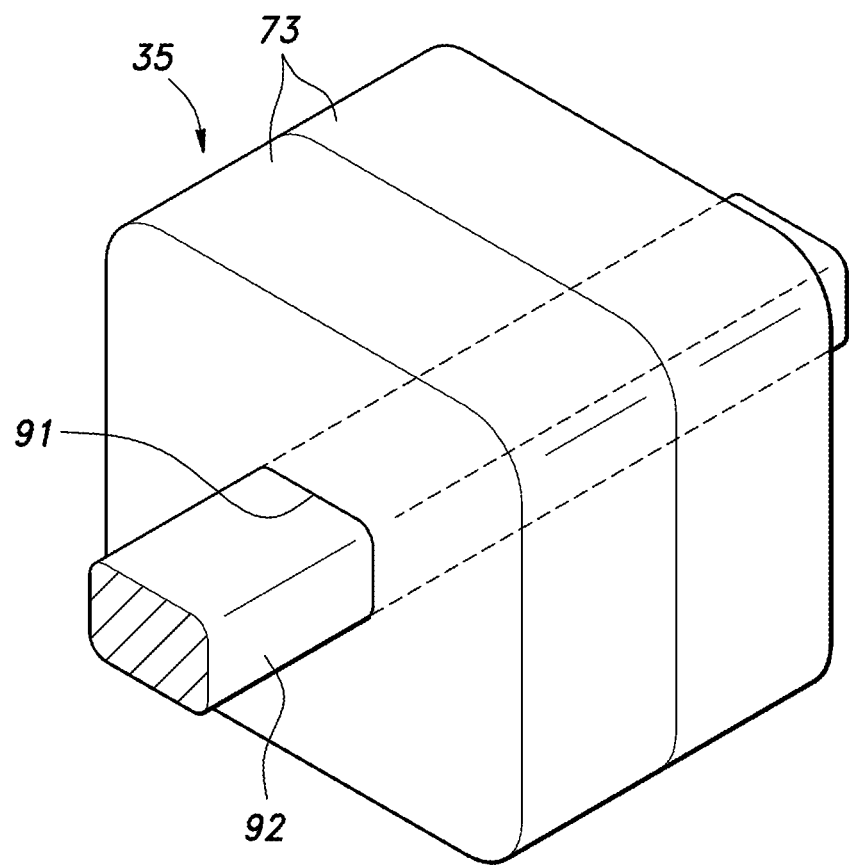
FIG. 9 is an explanatory diagram showing a modification of the fluid bag.

As shown in FIG. 9, the first fluid bag 35 may have a through hole 91 penetrating in the fore and aft direction at the central portion. Namely, the first fluid bag 35 may be formed in an annular or tubular shape having an axis extending in the fore and aft direction at the center. In addition, a support shaft 92 extending in the fore and aft direction is preferably inserted in the through hole 91 of the first fluid bag 35. In this arrangement, the first fluid bag 35 expands and contracts along the support shaft 92, and therefore, can push the pressure receiving plate 53 efficiently.

Figure 10:
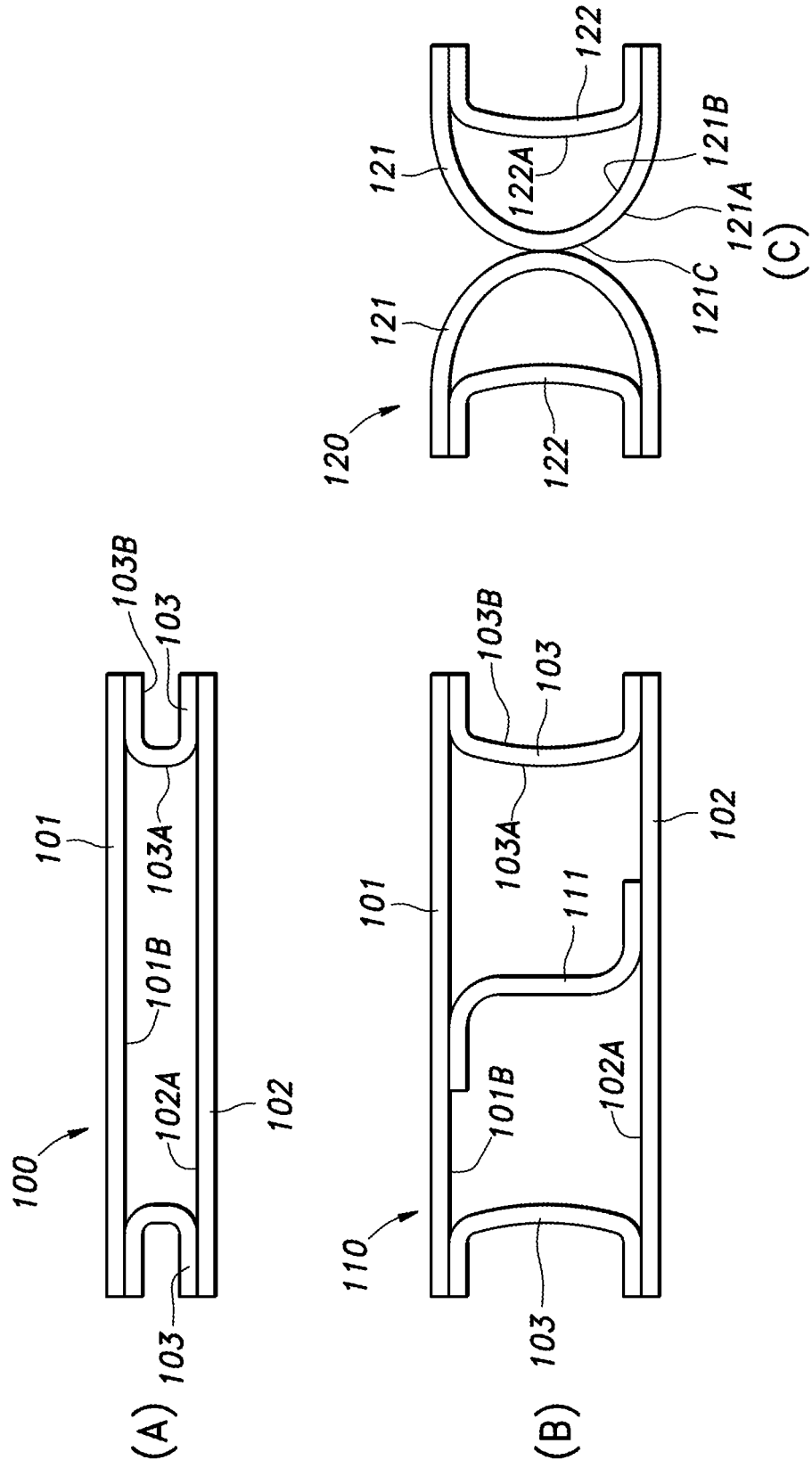
FIG. 10 is an explanatory diagram showing (A) a first example, (B) a second example, and (C) a third example of a cell constituting the fluid bag.

Each of the cells 73 constituting the first fluid bag 35 and the second fluid bag 36 may be configured as in first to third examples shown in FIG. 10. As shown in FIG. 10(A), a cell 100 of the first example includes a circular front sheet material 101, a circular rear sheet material 102, and an outer peripheral sheet material 103 formed in a cylindrical shape. An outer peripheral portion of the rear surface 101B of the front sheet material 101 is heat-welded to a front end portion of an inner circumferential surface 103A of the outer peripheral sheet material 103. Also, an outer peripheral portion of the front surface 102A of the rear sheet material 102 is heat-welded to a rear end portion of the inner circumferential surface 103A of the outer peripheral sheet material 103. Since the cell 100 has the outer peripheral sheet material 103, flexibility of the outer peripheral portions is high and the cell 100 can expand and contract easily in the fore and aft direction even at the outer peripheral portions compared to a cell in which the outer peripheral portion of the rear surface 101B of the front sheet material 101 and the outer peripheral portion of the front surface 102A of the rear sheet material 102 are heat-welded directly to each other. Thereby, the expansion and contraction directions of the first fluid bag 35 and the second fluid bag 36 constituted of multiple cells 100 tend to be stable. As a modification of the first example, the outer peripheral portion of the rear surface 101B of the front sheet material 101 may be heat-welded to a front end portion of an outer circumferential surface 103B of the outer peripheral sheet material 103 and the outer peripheral portion of the front surface 102A of the rear sheet material 102 may be heat-welded to a rear end portion of the outer circumferential surface 103B of the outer peripheral sheet material 103.

As shown in FIG. 10(B), a cell 110 of the second example includes, in addition to the structure of the cell 100 of the first example, a connection sheet material 111 coupling the central portion of the rear surface 101B of the front sheet material 101 with the central portion of the front surface 102A of the rear sheet material 102. The connection sheet material 111 has a front end welded to the central portion of the rear surface 101B of the front sheet material 101 and a rear end welded to the central portion of the front surface 102A of the rear sheet material 102. When the cell 110 expands, the connection sheet material 111 restricts the distance between the central portion of the front sheet material 101 and the central portion of the rear sheet material 102 so as not to be greater than or equal to a predetermined distance. Thereby, it is possible to avoid expansion of only the central portion of the cell 110, and the difference in the amount of expansion between the central portion and the outer peripheral portion can be reduced.

As shown in FIG. 10(C), a cell 120 of the third example includes a tubular inner peripheral sheet material 121 and a tubular outer peripheral sheet material 122 disposed on the outer peripheral side of the inner peripheral sheet material 121. The length of the inner peripheral sheet material 121 in the axial direction is longer than the length of the outer peripheral sheet material 122 in the axial direction. The front end of the outer circumferential surface 121B of the inner peripheral sheet material 121 is heat-welded to the front end of the inner circumferential surface 122A of the outer peripheral sheet material 122 over the entire circumference. Also, the rear end of the outer circumferential surface 121B of the inner peripheral sheet material 121 is heat-welded to the rear end of the inner circumferential surface 122A of the outer peripheral sheet material 122 over the entire surface. Also, the central portions 121C of the inner circumferential surface 121A of the inner peripheral sheet material 121 in the axial direction is heat-welded. The cell 120 of the third example can reduce the difference in the amount of expansion between the central portion and the outer peripheral portion.

An operation of the seat 1 regarding the embodiment will be described. While an occupant keeps pushing the extension button of the operation switch 44, in accordance with the signal from the operation switch 44, the electronic control device 43 drives the compressor 38 to generate compressed air, puts the first control valve 41 in the supply state, and puts the second control valve 42 in the discharge state. Thereby, the compressed air generated by the compressor 38 is supplied to the first fluid bag 35 of the first actuator 31, and the first fluid bag 35 expands to urge the pressure receiving plate 53 toward the front side. On the other hand, the second fluid bag 36 of the second actuator 32 is pushed by the pressure receiving plate 53, and the air in the second fluid bag 36 is discharged through the second control valve 42. Thereby, the pressure receiving plate 53 is pushed by the first fluid bag 35 of the first actuator 31 toward the front side and moves forward relative to the front member 18.

While the occupant keeps pushing the contraction button of the operation switch 44, in accordance with the signal from the operation switch 44, the electronic control device 43 drives the compressor 38 to generate compressed air, puts the first control valve 41 in the discharge state, and puts the second control valve 42 in the supply state. Thereby, the compressed air generated by the compressor 38 is supplied to the second fluid bag 36 of the second actuator 32, and the second fluid bag 36 expands to urge the pressure receiving plate 53 toward the rear side. On the other hand, the first fluid bag 35 of the first actuator 31 is pushed by the pressure receiving plate 53, and the air in the first fluid bag 35 is discharged through the first control valve 41. Thereby, the pressure receiving plate 53 is pushed by the second fluid bag 36 of the second actuator 32 toward the rear side and moves rearward relative to the front member 18.

When the occupant does not push either of the extension button and the contraction button of the operation switch 44, in accordance with the signal from the operation switch 44, the electronic control device 43 stops the compressor 38 and puts the first control valve 41 and the second control valve 42 in the holding state. Thereby, the expansion and contraction state of the first fluid bag 35 of the first actuator 31 and the second fluid bag 36 of the second actuator 32 is maintained, and the position of the second frame 16 relative to the front member 18 is maintained.

As described in the foregoing, the occupant can make the front portion of the seat cushion 3 expand and contract in the fore and aft direction by operating the operation switch 44.

In the seat 1 according to the embodiment, when one of the first actuator 31 and the second actuator 32 generates an urging force, the other of the first actuator 31 and the second actuator 32 can be prevented from generating a resistive force. Thereby, the driving force for making the seat 1 expand and contract can be reduced. Since the first actuator 31 and the second actuator 32 are formed of the fluid bags 35, 36, they can be formed simply and at low cost.

Because the pressure receiving plate 53, the actuator 30, and the case 55 are disposed in the lower portion of the seat cushion 3, interference of these structures with the occupant's legs can be avoided.

Figure 11:
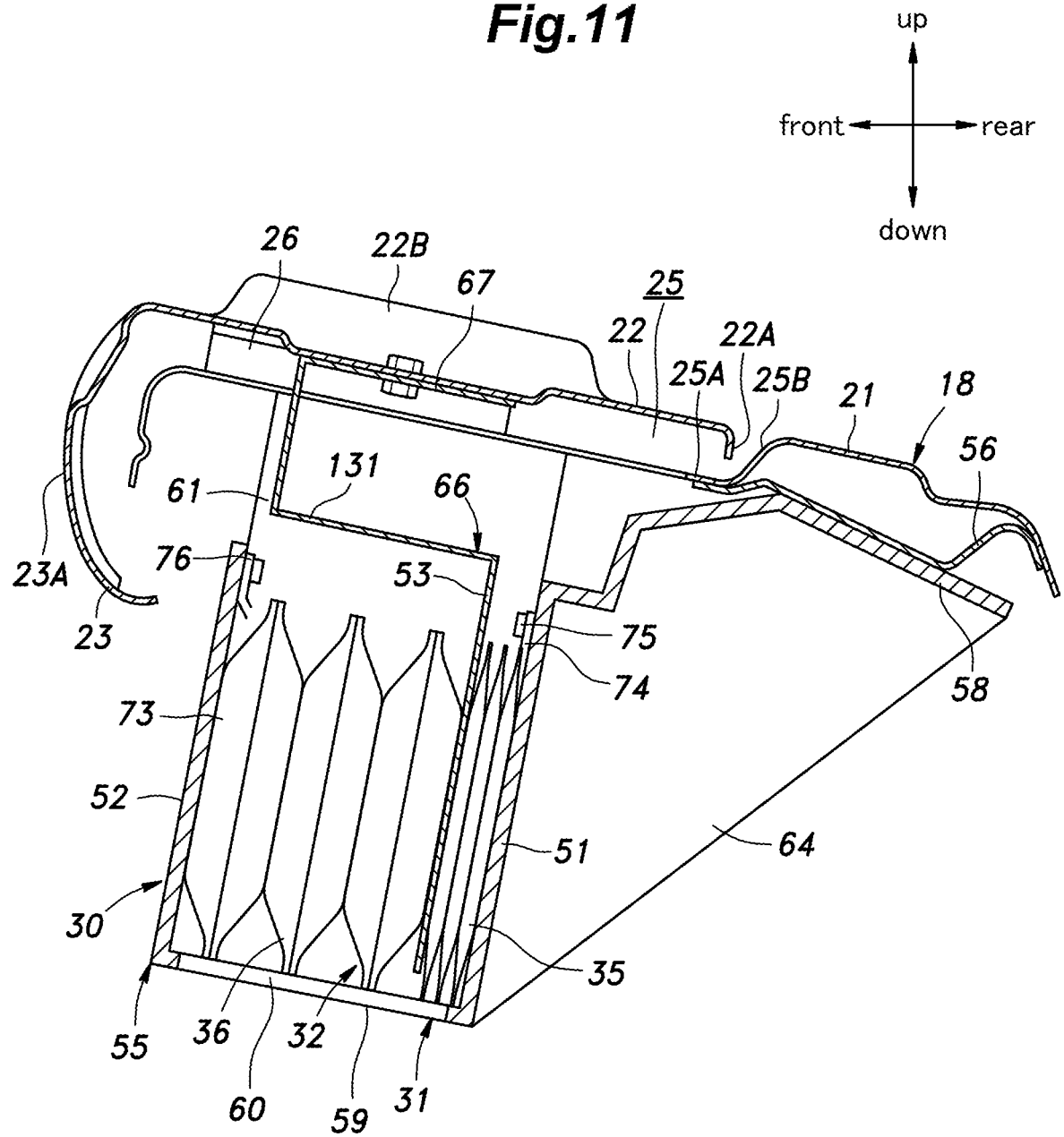
FIG. 11 is a sectional view of the front portion of the seat cushion frame according to a modification.

Concrete embodiments of the present invention have been described in the foregoing, but the present invention is not limited to the above embodiments and may be modified or altered in various ways. For example, as shown in FIG. 11, a connecting portion 68 for adjusting the position of the pressure receiving plate 53 may be provided between the flange 67 and the pressure receiving plate 53. The connecting portion 68 may extend downward from the front edge of the flange 67 and thereafter be bent to extend rearward. The pressure receiving plate 53 may extend downward from the rear end of the connecting portion 68.

LIST OF REFERENCE NUMERALS

1: seat
11: seat cushion frame
15: first frame
16: second frame
17: side member

18: front member
19: rear member
21: plate-shaped portion
22: upper plate
23: front plate
25: accommodation recess
26: support member
27: elongated hole
29: bolt
30: actuator
31: first actuator
32: second actuator
33: control device
35: first fluid bag
36: second fluid bag
38: compressor
41: first control valve
42: second control valve
43: electronic control device
44: operation switch
51: first wall
52: second wall
53: pressure receiving plate
55: case
59: bottom wall
61: end wall
80: guide member
81: guide wall
82: guide groove
84: rail
85: slider
87: connecting member
88: through hole

The invention claimed is:

1. A vehicle seat, comprising:
a first frame, the first frame including a first wall and a second wall disposed on the first side relative to the first wall;
a second frame supported to be movable relative to the first frame toward a first side and a second side opposite to the first side, the second frame including a pressure receiving plate disposed between the first wall and the second wall; and
an actuator for causing the second frame to move relative to the first frame toward the first side and the second side, the actuator comprising:
a first actuator that urges the second frame toward the first side, the first actuator including a first fluid bag disposed between the first wall and the pressure receiving plate;
a second actuator that urges the second frame toward the second side, the second actuator including a second fluid bag disposed between the second wall and the pressure receiving plate, an end portion of the first fluid bag on the first side and an end portion of the second fluid bag on the second side being joined to each other by a connecting member penetrating the pressure receiving plate; and
a control device that controls an urging force generated by each of the first actuator and the second actuator, compressed air being supplied to and discharged from the first fluid bag and the second fluid bag by the control device.

2. The vehicle seat according to claim 1, wherein the first actuator includes a guide member that slidably contacts the first fluid bag and restricts expansion and contraction directions of the first fluid bag to the first side and the second side.

3. The vehicle seat according to claim 1, wherein the first actuator includes a rail extending from the first side toward the second side and a slider supported by the rail to be slidingly movable and joined to the first fluid bag.

4. The vehicle seat according to claim 1, wherein a lower portion of the first wall and a lower portion of the second wall are coupled by a bottom wall, and
wherein the first wall, the bottom wall, and the second wall cooperate to form a groove structure that opens upward.

5. The vehicle seat according to claim 1, wherein the first frame is a frame constituting a seat cushion,
wherein a seat back is supported on a rear portion of the seat cushion, and
wherein the seat cushion is provided on a floor via slide rails.

6. A vehicle seat, comprising:
a first frame, the first frame including a first wall and a second wall disposed on the first side relative to the first wall, the first frame being a frame constituting a seat cushion and including left and right side members and a front member coupling front ends of the left and right side members to each other;
a second frame supported to be movable relative to the first frame toward a first side and a second side opposite to the first side, the second frame including a pressure receiving plate disposed between the first wall and the second wall, the second frame including an upper plate provided on an upper surface of the front member and supported to be movable relative to the front member to a front side and a rear side, the second frame further including a front plate depending from a front end of the upper plate to be disposed in front of the front member; and
an actuator for causing the second frame to move relative to the first frame toward the first side and the second side, the actuator comprising:
a first actuator that urges the second frame toward the first side, the first actuator including a first fluid bag disposed between the first wall and the pressure receiving plate;
a second actuator that urges the second frame toward the second side, the second actuator including a second fluid bag disposed between the second wall and the pressure receiving plate; and
a control device that controls an urging force generated by each of the first actuator and the second actuator, compressed air being supplied to and discharged from the first fluid bag and the second fluid bag by the control device.

7. The vehicle seat according to claim 6, wherein the front member has an opening vertically penetrating therethrough and extending in a fore and aft direction, and
wherein the pressure receiving plate extends from the upper plate to pass the opening and protrudes to below the front member.

8. The vehicle seat according to claim 7, wherein the first wall and the second wall are disposed below the front member.

9. The vehicle seat according to claim 6, wherein a seat back is supported on a rear portion of the seat cushion, and
wherein the seat cushion is provided on a floor via slide rails.

10. A method of making a vehicle seat comprising:
preparing a first frame, the first frame including a first wall and a second wall disposed on the first side relative to the first wall, the first frame being a frame constituting a seat cushion and including left and right side members and a front member coupling front ends of the left and right side members to each other;

supporting a second frame movably relative to the first frame toward a first side and a second side opposite to the first side, the second frame including a pressure receiving plate disposed between the first wall and the second wall, the second frame including an upper plate provided on an upper surface of the front member and supported to be movable relative to the front member to a front side and a rear side, the second frame further including a front plate depending from a front end of the upper plate to be disposed in front of the front member; and preparing an actuator for causing the second frame to move relative to the first frame toward the first side and the second side, the actuator comprising a first actuator that urges the second frame toward the first side, a second actuator that urges the second frame toward the second side, and a control device that controls an urging force generated by each of the first actuator and the second actuator, the first actuator including a first fluid bag disposed between the first wall and the pressure receiving plate, the second actuator including a second fluid bag disposed between the second wall and the pressure receiving plate, compressed air being supplied to and discharged from the first fluid bag and the second fluid bag by the control device.

* * * * *